United States Patent
Kim et al.

(10) Patent No.: US 11,367,923 B2
(45) Date of Patent: Jun. 21, 2022

(54) CYLINDRICAL SECONDARY BATTERY

(71) Applicant: Samsung SDI Co., Ltd., Yongin-si (KR)

(72) Inventors: Dae Kyu Kim, Yongin-si (KR); Sung Gwi Ko, Yongin-si (KR); Shin Jung Kim, Yongin-si (KR); Byoung Min Chun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 51 days.

(21) Appl. No.: 16/771,639

(22) PCT Filed: Dec. 14, 2017

(86) PCT No.: PCT/KR2017/014753
§ 371 (c)(1),
(2) Date: Jun. 10, 2020

(87) PCT Pub. No.: WO2019/117368
PCT Pub. Date: Jun. 20, 2019

(65) Prior Publication Data
US 2020/0365856 A1    Nov. 19, 2020

(51) Int. Cl.
*H01M 50/30* (2021.01)
*H01M 50/107* (2021.01)
(Continued)

(52) U.S. Cl.
CPC ......... *H01M 50/30* (2021.01); *H01M 50/107* (2021.01); *H01M 50/166* (2021.01);
(Continued)

(58) Field of Classification Search
CPC .... H01M 50/30; H01M 50/107; H01M 50/54; H01M 50/572; H01M 50/171; H01M 50/166
See application file for complete search history.

(56) References Cited

U.S. PATENT DOCUMENTS 6,900,616 B2 * 5/2005 Burrus, IV ............... C09D 5/00
                                                        320/147
11,069,916 B2   7/2021 Haraguchi et al.
(Continued)

FOREIGN PATENT DOCUMENTS

CN    101814621 A    8/2010
CN    103283055 A    9/2013
(Continued)

OTHER PUBLICATIONS

EPO machine generated English translation of EP-0438031-B1 (Year: 1994).*

(Continued)

*Primary Examiner* — Christopher P Domone
*Assistant Examiner* — Kimberly Wyluda
(74) *Attorney, Agent, or Firm* — Lewis Roca Rothgerber Christie LLP

(57) ABSTRACT

The present invention provides a cylindrical secondary battery which can have increased safety and capacity, and enhanced scratch resistance and pressure resistance on an external contact surface. To this end, a cylindrical secondary battery is disclosed, the battery comprising: a cylindrical case; an electrode assembly received in the case; and a cap assembly for sealing the case, wherein the cap assembly comprises a top plate having a notch formed on at least one surface thereof, a middle plate coupled to the top plate and including a first through-hole formed through the center thereof, and a bottom plate electrically connected with the electrode assembly and coupled to the top plate through the first through-hole of the middle plate, and includes a surface-treated region formed by surface-treating a surface of the top plate so as to have a concave-convex structure.

11 Claims, 6 Drawing Sheets

(51) Int. Cl.
    *H01M 50/166* (2021.01)
    *H01M 50/54* (2021.01)
    *H01M 50/171* (2021.01)
    *H01M 50/572* (2021.01)

(52) U.S. Cl.
    CPC ......... *H01M 50/171* (2021.01); *H01M 50/54* (2021.01); *H01M 50/572* (2021.01)

(56) References Cited

U.S. PATENT DOCUMENTS

| | | | |
|---|---|---|---|
| 2005/0277017 A1* | 12/2005 | Cho | H01M 50/3425 429/56 |
| 2010/0215997 A1 | 8/2010 | Byun et al. | |
| 2013/0273414 A1 | 10/2013 | Lee et al. | |
| 2017/0133645 A1 | 5/2017 | Miyata et al. | |
| 2017/0194620 A1 | 7/2017 | Kim | |
| 2018/0159100 A1* | 6/2018 | Lee | H01M 50/30 |
| 2019/0103625 A1 | 4/2019 | Haraguchi et al. | |

FOREIGN PATENT DOCUMENTS

| | | | | |
|---|---|---|---|---|
| EP | 0438031 B1 | * | 3/1994 | ............ B21H 8/005 |
| KR | 10-2010-0096981 A | | 9/2010 | |
| KR | 10-1029389 B1 | | 4/2011 | |
| KR | 10-1229229 B1 | | 1/2013 | |
| KR | 10-2017-0012138 A | | 2/2017 | |
| KR | 10-2017-0082316 A | | 7/2017 | |
| KR | 20180113693 A | * | 10/2018 | |
| WO | WO 2017/164000 A1 | | 1/2019 | |

OTHER PUBLICATIONS

EPO machine generated English translation of KR-2018-0113693-A (Year: 2018).*
International Search Report with English Translation for corresponding Korean International Application No. PCT/KR2017/014753, dated Sep. 11, 2018, 5 pages.
First Chinese Office action dated Mar. 2, 2022 issued in corresponding CN Application No. 201780098148.5, 9 pages.

* cited by examiner

CYLINDRICAL SECONDARY BATTERY

CROSS-REFERENCE TO RELATED APPLICATION(S)

This application is a National Phase Patent Application of International Patent Application Number PCT/KR2017/014753, filed on Dec. 14, 2017. The entire contents of which are incorporated herein by reference.

TECHNICAL FIELD

The present invention relates to a cylindrical secondary battery which can have increased safety and capacity, and enhanced scratch resistance and pressure resistance on an external contact surface.

BACKGROUND ART

Lithium ion secondary batteries are being widely used in portable electronic devices and power sources of hybrid automobiles or electric vehicles because of various advantages, including a high operation voltage, a high energy density per unit weight, and so forth.

The lithium ion secondary battery can be largely classified as a cylinder type secondary battery, a prismatic type secondary battery, a pouch type secondary battery. Specifically, the cylindrical lithium ion secondary battery generally includes a cylindrical electrode assembly, a cylindrical can coupled to the electrode assembly, an electrolyte injected into the can to allow movement of lithium ions, and a cap assembly coupled to one side of the can to prevent leakage of the electrolyte and separation of the electrode assembly.

DESCRIPTION OF EMBODIMENTS

Technical Problem

The present invention provides a cylindrical secondary battery which can have increased safety and capacity and enhanced scratch resistance and pressure resistance on an external contact surface.

Solution to Problem

According to an embodiment of the present invention, provided is a cylindrical secondary battery comprising: a cylindrical case; an electrode assembly received in the case; and a cap assembly for sealing the case, wherein the cap assembly comprises a top plate having a notch formed on at least one surface thereof, a middle plate coupled to the top plate and including a first through-hole formed through the center thereof, and a bottom plate electrically connected with the electrode assembly and coupled to the top plate through the first through-hole of the middle plate, and includes a surface-treated region formed by surface-treating a surface of the top plate so as to have a concave-convex structure.

Here, the surface-treated region may be formed on the surface of the top plate so as to deviate from a region where the notch is located.

In addition, the surface-treated region may be formed on the surface of the top plate so as to be inward positioned relative to the region where the notch is located.

In addition, the surface-treated region may be additionally formed on the surface of the top plate so as to be outward positioned relative to the region where the notch is located.

In addition, the surface-treated region may be formed to have at least one shape selected from a knurled shape, an embossed shape, grooves arranged in a latticed shape or a parallel line shape.

In addition, the top plate, including a centrally positioned upper region and an edge region coupled to the upper region through a stepped region, may seal the case, and the surface-treated region may be formed with respect to the upper region.

In addition, the edge region may be crimped using a crimping part formed on the case to then be coupled to the case.

In addition, the cylindrical secondary battery may further include an insulating plate between the bottom plate and the middle plate, the insulating plate including a hole corresponding to the first through-hole of the middle plate.

In addition, the middle plate may further include one or more second through-holes arranged outside the first through-hole.

In addition, the bottom plate may further include grooves located at a region coupled to the cap plate through the first through-hole of the middle plate.

In addition, the grooves may be positioned horizontally inward relative to the notch of the cap plate.

Advantageous Effects of Invention

As described above, the present invention provides a cylindrical secondary battery which can have increased safety by blocking a current path by a cap assembly when the pressure of internal gas is greater than a preset first reference pressure (operating pressure), and by allowing the cap assembly to be broken to release the internal gas to the outside when the pressure of internal gas is greater than a second reference pressure (breaking pressure).

In addition, the present invention provides a cylindrical secondary battery which can reduce the battery size while increasing the battery capacity by reducing the overall height of the battery by the reduced height of the cap assembly.

In addition, the present invention provides a cylindrical secondary battery which can reduce surface scratch and can endure the pressure such as a load by performing surface treatment, such as knurling or embossing, on the surface of the cap plate of the cap assembly.

BRIEF DESCRIPTION OF REFERENCE NUMERALS

Figure 1A:
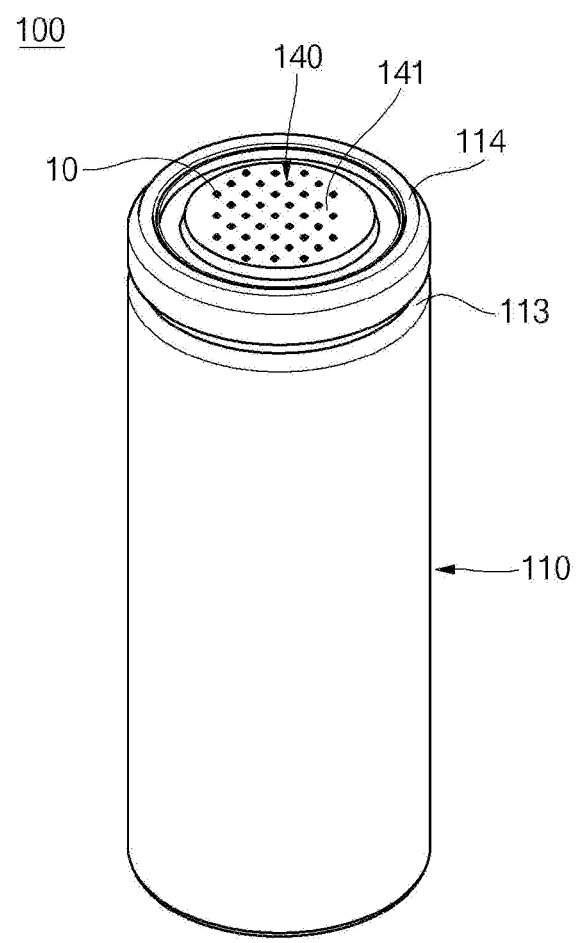
FIGS. 1A and 1B are a perspective view and a cross-sectional view of a cylindrical secondary battery according to an embodiment of the present invention.

140: Cap assembly
141a: Top surface
141c: Notch
141e: Edge region
141g: Side region
142: Middle plate
142b: Second through-hole
143: Insulating plate
144: Bottom plate
144b: Second region
144d: Groove
10, 20, 30: Surface-treated region
141: Top plate
141b: Bottom surface
141d: Top region
141f: Stepped region
141h: Bottom region
142a: First through-hole
142c: Bent region
143a: Through-hole
144a: First region
144c: Third region
146A, 146B: Welding region

MODE OF INVENTION

Hereinafter, embodiments of the present invention will be described in detail.

The embodiments of the present invention, however, may be modified in many different forms and should not be construed as being limited to the example (or exemplary) embodiments set forth herein. Rather, these example embodiments are provided so that this invention will be thorough and complete and will convey the embodiments and features of the present invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Hereinafter, a configuration of a cylindrical secondary battery according to an embodiments will now be described.

Figure 1B:
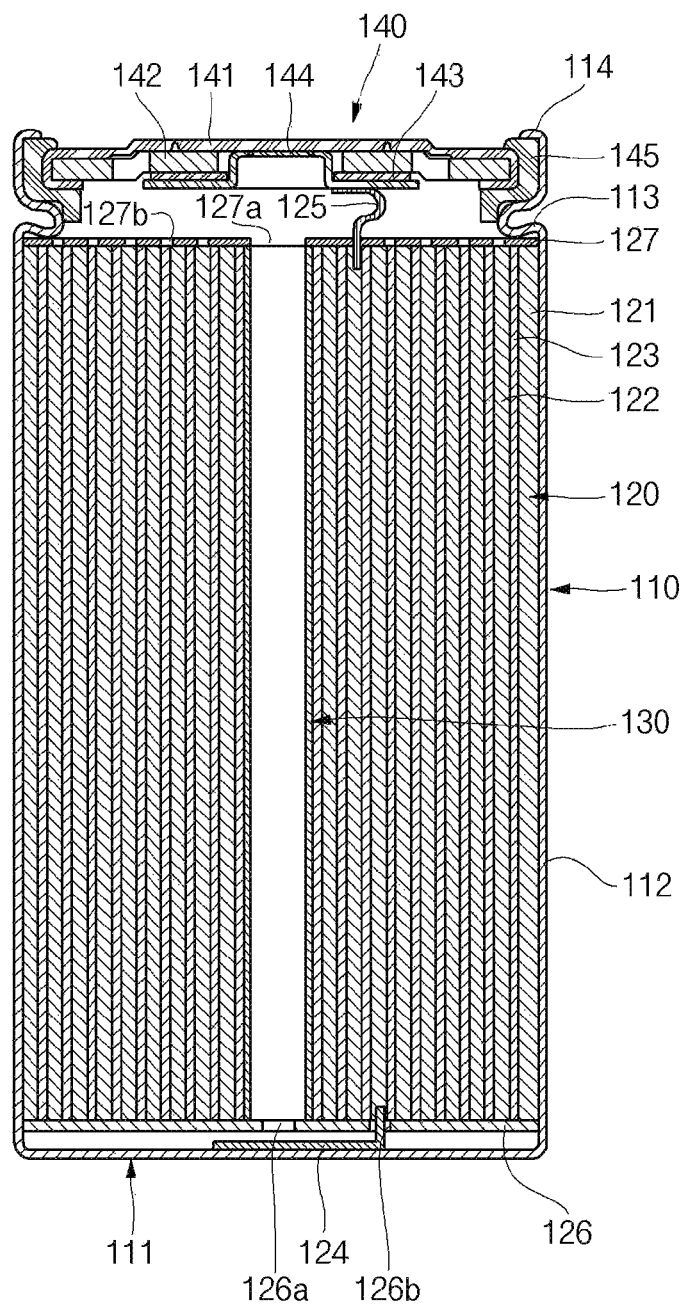
Figure 1C:
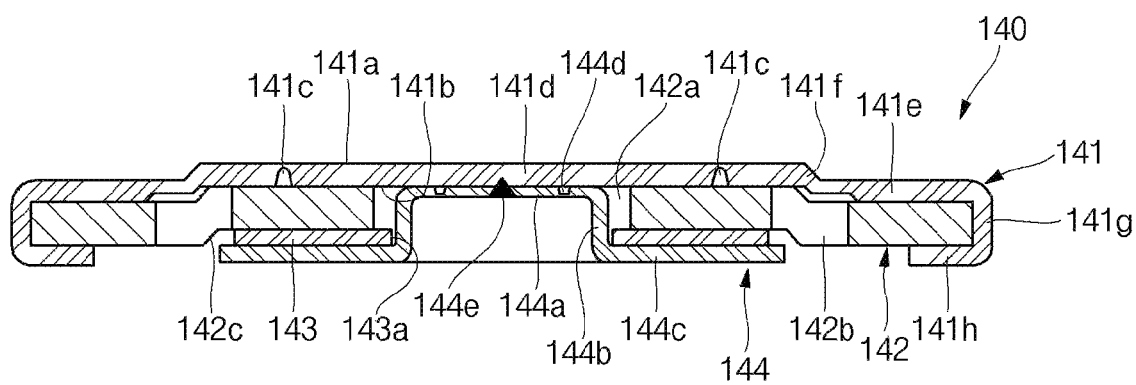
FIG. 1C is an enlarged cross-sectional view illustrating only a cap assembly.

FIGS. 1A and 1B are a perspective view and a cross-sectional view of a cylindrical secondary battery according to an embodiment of the present invention and FIG. 1C is an enlarged cross-sectional view illustrating only a cap assembly.

First, as illustrated in FIGS. 1A, 1B and 1C, the cylindrical secondary battery 200 according to various embodiments may include a case 110, an electrode assembly 120 and a cap assembly 140. In some cases, the cylindrical secondary battery 200 may further include a center pin 130.

The cylindrical case 110 includes a circular bottom portion 111 and a sidewall 112 upwardly extending by a predetermined length from the bottom portion 111. In the course of manufacturing the secondary battery, a top portion of the case 110 is opened. Therefore, during manufacturing of the secondary battery, the electrode assembly 120 and the center pin 130 may be inserted into the case 110 together with an electrolyte. The case 110 may be made of steel, stainless steel, aluminum, an aluminum alloy or equivalents thereof, but embodiments of the present invention are not limited to the above materials. In addition, the case 110 includes an inwardly recessed beading part 113 formed at a lower portion of the cap assembly 140 to prevent the cap assembly 140 from being deviated to the outside, and an inwardly bent crimping part 114 formed at an upper portion of the cap assembly 140. Here, the electrolyte may be in a liquid, solid or gel phase, but embodiments of the present invention are not limited to the above phases.

The electrode assembly 120 is accommodated in the case 110. The electrode assembly 120 includes a negative electrode plate 121 coated with a negative electrode active material (e.g., graphite, carbon, etc.), a positive electrode plate 122 coated with a positive electrode active material (e.g., a transition metal oxide, such as $LiCoO_2$, $LiNiO_2$, $LiMn_2O_4$, etc.), and a separator 123 positioned between the negative electrode plate 121 and the positive electrode plate 122 to prevent an electric short and allowing only movement of lithium ions. The negative electrode plate 121, the positive electrode plate 122 and the separator 123 are wound up in a substantially cylindrical shape. Here, the negative electrode plate 121 may be made of a copper (Cu) foil, and the positive electrode plate 122 may be made of an aluminum (Al) foil, and the separator 123 may be made of polyethylene (PE) or polypropylene (PP), but embodiments of the present invention are not limited to the above materials. In addition, a negative electrode tab 124 projected downwardly and extending with a predetermined length may be welded to the negative electrode plate 121 and a positive electrode tab 125 projected upwardly with a predetermined length may be welded to the positive electrode plate 122, and vice versa. In addition, the negative electrode tab 124 may be made of nickel (Ni) and the positive electrode tab 125 may be made of aluminum (Al), but embodiments of the present invention are not limited to the above materials.

In addition, the negative electrode tab 124 of the electrode assembly 120 may be welded to the bottom portion 111 of the case 110. Therefore, the case 110 may function as a negative electrode. To the contrary, the positive electrode tab 125 may be welded to the bottom portion 111 of the case 110, and in this case, the case 110 may function as a positive electrode.

In addition, a first insulating plate 126 coupled to the case 110 and having a first hole 126a formed at its central portion and a second hole 126b formed at its exterior side may be interposed between the electrode assembly 120 and the bottom portion 111. The first insulating plate 126 prevents the electrode assembly 120 from electrically contacting the bottom portion 111 of the case 110. In particular, the first insulating plate 126 prevents the positive electrode plate 122 of the electrode assembly 120 from electrically contacting the bottom portion 111. Here, when a large amount of gas is generated due to abnormality of the secondary battery, the first hole 126a allows the gas to rapidly move upwardly through the center pin 130, and the second hole 126b allows the negative electrode tab 124 to pass through the same to be welded to the bottom portion 111.

In addition, a second insulating plate 127 coupled to the case 110 and having a first hole 127a formed at its central portion and a plurality of second holes 127b formed at its exterior side may be interposed between the electrode assembly 120 and the cap assembly 140. The second insulating plate 127 prevents the electrode assembly 120 from electrically contacting the cap assembly 140. In particular, the second insulating plate 127 prevents the negative electrode plate 121 of the electrode assembly 120 from electrically contacting the cap assembly 140. Here, when a large amount of gas is generated due to abnormality of the secondary battery, the first hole 127a allows the gas to rapidly move to the cap assembly 140, and the second holes 127b allow the positive electrode tab 125 to pass through the same to be welded to the cap assembly 140. In addition, in an electrolyte injection process, the second holes 127b allow the electrolyte to rapidly flow into the electrode assembly 120.

In addition, since diameters of the first holes 126a and 127a of the first and second insulating plates 126 and 127 are smaller than a diameter of the center pin 130, it is possible to prevent the center pin 130 from electrically contacting the bottom portion 111 of the case 110 or the cap assembly 140 due to an external shock.

The center pin 130 is shaped of a hollow cylindrical pipe and is coupled to a substantially central portion of the electrode assembly 120. The center pin 130 may be made of steel, stainless steel, aluminum, an aluminum alloy, or polybutylene terephthalate, but embodiments of the present invention are not limited to the above materials. The center pin 130 prevents the electrode assembly 120 from being deformed during charging or discharging of the secondary battery, and may serve as a gas movement path.

The cap assembly 140 may include a top plate 141, a middle plate 142, an insulating plate 143 and a bottom plate 144.

The top plate 141 includes a substantially planar top surface 141a and a substantially planar bottom surface 141b opposite to the top surface 141a. Particularly, the top plate 141 may further at least one notch 141c formed on the bottom surface 141b. Here, when viewed from below, the notch 141c may have, for example, a substantially circular, elliptical or "C" shape, but embodiments of the present invention are not limited to the above shapes. The notch 141c is broken or ruptured when the internal gas pressure of the secondary battery is greater than a predetermined reference pressure (breaking pressure), thereby rapidly releasing the internal gas of the battery to the outside.

In addition, the top plate 141 may include an upper region 141d, an edge region 141e, a side region 141g, and a lower region 141h. The upper region 141d may be positioned on the middle plate 142 and may be substantially planar. The upper region 141d may serve as a terminal of the secondary battery, and thus may be electrically connected to an external device (e.g., a load or a charger).

In addition, as will later be described, a surface-treated region 10 may further be formed in the upper region 141d. The surface-treated region 10 may be formed by performing surface treatment on the top surface of the upper region 141d through knurling or embossing, and thus may become highly resistant to scratch and may be able to endure an external load.

The edge region 141e may be coupled to the upper region 141d through a stepped region 141e having a predetermined height, and thus may be formed at a lower position than the upper region 141d. The edge region 141e may be substantially shaped of a ring located along the edge of the upper region 141d. In addition, the outer part of the edge region 141e may be coupled to the case 110 by crimping the edge region 141e with the side region 141g and the lower region 141h by the crimping part 114 of the case 110.

When viewed from below, the stepped region 141g may be shaped of a substantially circular ring. As an example, the upper region 141d located inside the stepped region 141f may be positioned higher than the edge region 141e located outside the stepped region 141f. In addition, the notch 141c may be formed on the bottom surface of the upper region 141d located inside the stepped region 141f.

The side region 141g may be downwardly bent from the upper region 141d to substantially surround the side portion of the middle plate 142.

The lower region 141h is horizontally inwardly bent from the side region 141g to then be coupled to a bottom portion of the middle plate 142. In such a manner, the top plate 141 may be coupled to the middle plate 142 by the upper region 141d, the edge region 141e, the side region 141g and the lower region 141h.

The top plate 141 may be made of, for example, aluminum, aluminum, an aluminum alloy or equivalents thereof, but embodiments of the present invention are not limited to the above materials. Accordingly, an aluminum bus bar, an external lead or an external device may be easily connected (or welded) to the top plate 141.

Here, the top plate 141 may be made of one selected from the group consisting of 1XXX series alloys, that is, pure aluminum of 99.0% or greater purity, 2XXX series alloys, that is, Al—Cu alloys, 3XXX series alloys, that is, Al—Mn alloys, 4XXX series alloys, that is, Al—Si alloys, 5XXX series alloys, that is, Al—Mg alloys, 6XXX series alloys, that is, Al—Mg—Si alloys, and 7XXX series alloys, that is, Al—Zn—(Mg, Cu) alloys.

Specifically, the top plate 141 is preferably made of soft aluminum among the above-mentioned series alloys. For example, the top plate 141 may be made of, but not limited to, a 5XXX series (e.g., 5052, 5056, 5083, or 5454) Al—Mg alloy having a high strength, excellent corrosion resistance and good weldability. Additionally, a 1XXX, 3XXX or 4XXX series alloy, which is a non-heat treatable alloy, may be used as a material of the top plate 141.

Therefore, as will later be described, when the internal pressure of the case 110 is greater than or equal to a predetermined reference pressure (operating pressure), the upper region 141d may be upwardly inflated, thereby allowing the top plate 141 to be physically separated from the middle plate 142 to then be electrically disconnected from the middle plate 142. In addition, when the internal pressure of the case 110 is greater than or equal to the predetermined reference pressure (operating pressure), the notch 141c may be broken and opened, and thus the internal gas may be released to the outside, thereby increasing the safety.

In addition, since the top plate 141 has a smaller height than the upwardly protruding cap-up structure, the overall height of the cylindrical secondary battery 100 according to an embodiment of the present invention is reduced, thereby reducing the size of the secondary battery 100 and increasing the capacity thereof at the same height as in the conventional secondary battery.

The middle plate 142 may be positioned under the top plate 141 and may be substantially planar. In addition, the middle plate 142 may include a first through-hole 142a formed at a roughly central portion. Moreover, the middle plate 142 may include a plurality of second through-holes 142b formed around the first through-hole 142a.

Here, the first through-hole 142a may pass through a bottom plate 144, which will later be described, to then be electrically connected to the top plate 141, and may allow the internal gas pressure to be directly applied to the top plate 141. In addition, the second through-holes 142b may also allow the internal gas pressure to be directly applied to the top plate 141.

Here, the at least one notch 141c formed on the bottom surface 141b of the top plate 141 may be located to correspond to, for example, a region between the first through-hole 142a and each of the second through-holes 142b of the middle plate 142.

Additionally, the middle plate 142 may also include a bent region 142c formed on a region corresponding to the stepped region 141f of the top plate 141. Therefore, the middle plate 142 may be generally configured such that it makes a close contact with the bottom surface 141b of the top plate 141.

When a pressure is applied during crimping for forming the crimping part 114 of the case 110, in order to maintain the shape of the cap plate 141, the middle plate 142 may be made of, for example, aluminum, aluminum, an aluminum alloy or equivalents thereof. However, when the pressure applied during the crimping is not relatively large, the middle plate 142 may be made of, for example, an insulating material, such as polyethylene (PE), polypropylene (PP), or ethylene propylene diene monomer (M-class) rubber (EPDM rubber). In this case, since the bottom plate 144 is coupled to the top plate 141 through the first through-hole 142a of the middle plate 142, the electrical connection at normal times, or the electrical disconnection under the operating pressure and the breaking pressure, which will later be described, may be still performed.

The insulating plate 143 may be positioned under (attached to a bottom portion of) the middle plate 142 and may include a through-hole 143a located to correspond to the first through-hole 142a. When viewed from below, the insulating plate 143 may be shaped of a substantially circular ring having a predetermined width. In addition, the insulating plate 143 serves to insulate the middle plate 142 and the bottom plate 144 from each other. For example, the insulating plate 143 may be positioned between the middle plate 142 and the bottom plate 144 and may be subjected to ultrasonic welding, but embodiments of the present invention are not limited thereto.

The insulating plate 143 may be made of, for example, polyethylene (PE), polypropylene (PP), ethylene propylene diene monomer (M-class) rubber (EPDM rubber), or equivalents thereof, but embodiments of the present invention are not limited to the above materials.

The bottom plate 144 is electrically connected to the top plate 141 through the through-hole 143a of the insulating plate 143 and the through-hole 142a of the middle plate 142 to then be attached to the insulating plate 143. That is to say, the bottom plate 144 may include a first region 144a connected (welded) to the upper region 141d of the top plate 141, a second region 144b bent from the first region 144a and passing through the through-hole 142a of the middle plate 142 and the through-hole 143a of the insulating plate 143, and a third region 144c bent from the second region 144b and attached to the insulating plate 143. In FIG. 1C, undefined reference numeral 144e refers to a welding region in which the first region 144a of the bottom plate 144 is welded to the bottom surface 141b of the upper region 141d of the top plate 141.

Here, the positive electrode tab 125 may be electrically connected to the third region 144c of the bottom plate 144. In addition, the first region 144a of the bottom plate 144 may further include one or more concavely recessed grooves 144d. If the top plate 141 is upwardly convexly deformed when the internal gas pressure of the battery is greater than a predetermined pressure (operating pressure), the grooves 144d may serve to make the first region 144a of the bottom plate 144 separated from the second region 144b. Accordingly, a current path between the top plate 141 and the bottom plate 144 may be blocked.

The bottom plate 144 may be made of, for example, aluminum, aluminum, an aluminum alloy or equivalents thereof, and thus a positive electrode tab made of aluminum may be easily welded thereto.

The cap assembly 140 may further include an insulating plate 145 insulating the top plate 141 and the sidewall 111 of the case 110 from each other. Here, the insulating plate 145 is substantially compressed between the beading part 113 and the crimping part 114 formed on the sidewall 111 of the case 110. In addition, the insulating plate 145 may substantially cover the edge region 141e of the top plate 141, and the side region 141g and the lower region 141h, which are located around the edge region 141e.

Additionally, an electrolyte (not shown) is injected into the case 110, and lithium ions generated by an electrochemical reaction in the negative electrode plate 121 and the positive electrode plate 122 in the secondary battery during charging and discharging are allowed to move. The electrolyte may be a non-aqueous, organic electrolyte including a mixture of a lithium salt and a high-purity organic solvent. In addition, the electrolyte may be a polymer using a polymer electrolyte or a solid electrolyte. However, embodiments of the present invention are not limited to the above electrolytes.

Hereinafter, a configuration of a cylindrical secondary battery according to an embodiment of the present invention will be described in more detail.

Figure 2:
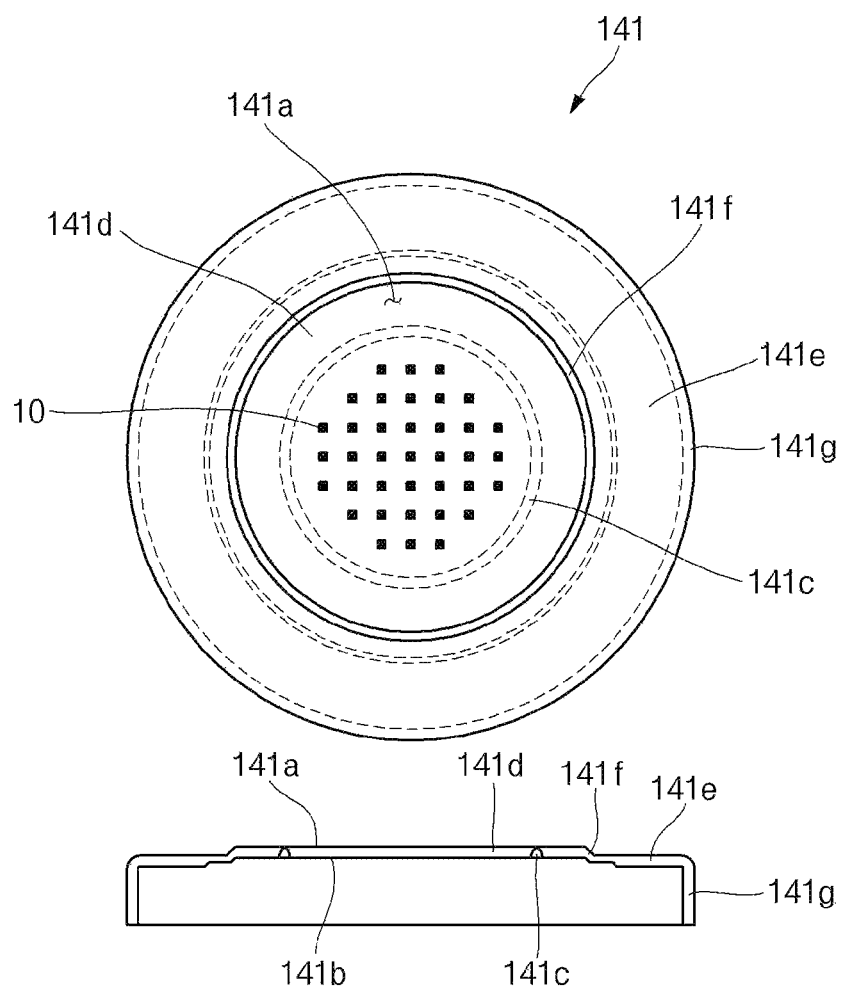
FIG. 2 illustrates top and side surfaces of a cap plate together in the cylindrical secondary battery according to an embodiment of the present invention.

FIG. 2 illustrates top and side surfaces of a cap plate together in the cylindrical secondary battery according to an embodiment of the present invention.

Referring to FIG. 2, the cap plate 141 may include a surface-treated region 10 formed on a top surface of at least a portion of the upper region 141d. The surface-treated region 10 may include a plurality of concave-convex structures prefabricated on the top surface of the upper region 141d by knurling or embossing treatment. The concave-convex structures may be formed on the upper region 141d to be spaced a regular distance apart from one another.

Compared to a plane that is not surface-treated, the surface-treated region 10 may have enhanced scratch resistance when it is brought into contact with an external device such as a charge/discharge pin or a load. In addition, formation of the surface-treated region 10 may improve pressure resistance, by which the upper region 141d is capable of enduring the pressure such as the load applied from the external device.

Meanwhile, the surface-treated region 10 may be formed on the upper region 141d so as to deviate from the notch 141c formed on the bottom surface of the cap plate 141, specifically, so as to be positioned horizontally inward relative to the notch 141c. With this arrangement, when the notch 141c and the surface-treated region 10 cross each other, particularly when knurling treatment is performed, the thickness of the cap plate 141 is reduced at the corresponding location, thereby preventing the cap plate 141 from being opened at a pressure lower than an appropriate reference pressure (breaking pressure). In addition, in a case when an external device is coupled to the cap plate 141, the external device is generally brought into contact with a central portion of the upper region 141d, and thus the scratch resistance or pressure resistance may be maintained with such arrangement of the surface-treated region 10.

Hereinafter, the operation of a cylindrical secondary battery according to an embodiment of the present invention will be described in more detail.

Figure 3A:
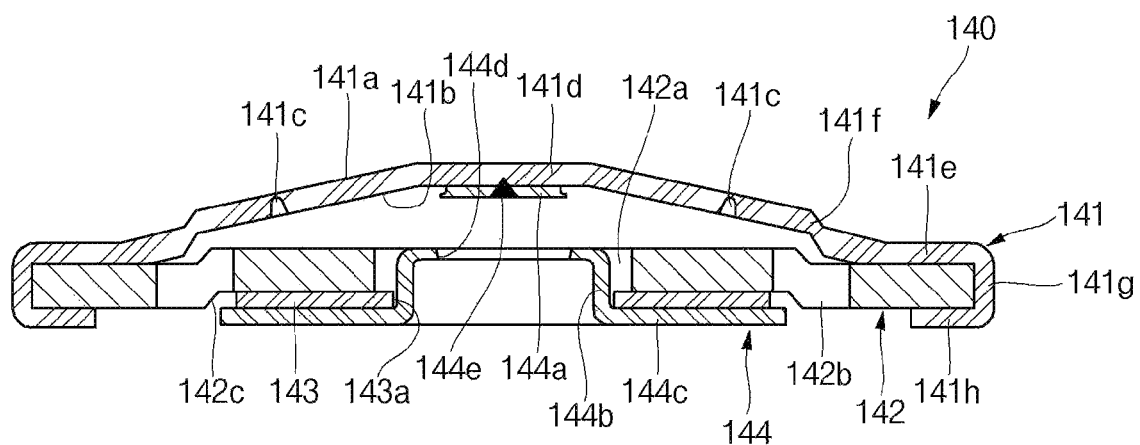
FIGS. 3A and 3B are cross-sectional views illustrating states in which a cap assembly operates and ruptures in a cylindrical secondary battery according to an embodiment of the present invention.
Figure 3B:
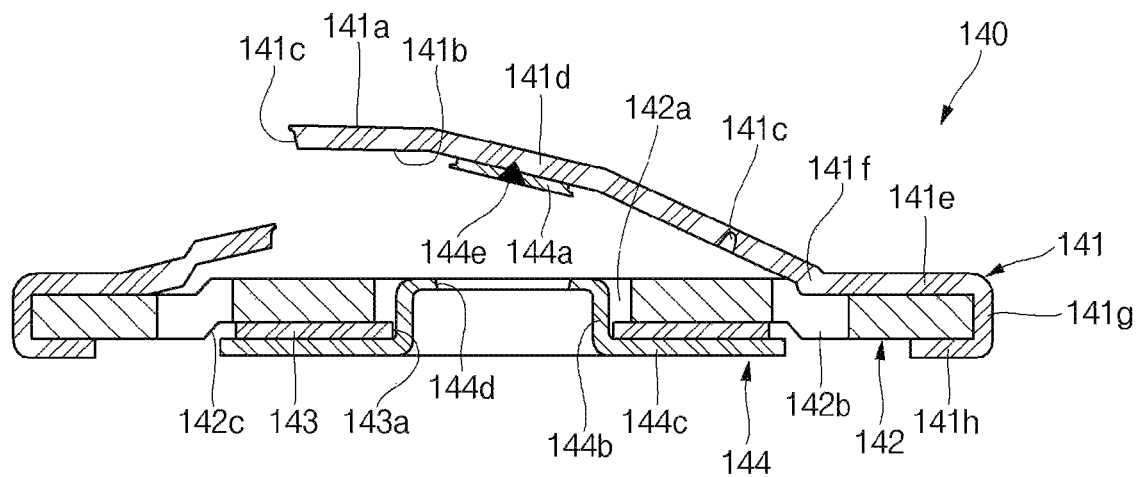

FIGS. 3A and 3B are cross-sectional views illustrating states in which a cap assembly operates and ruptures in a cylindrical secondary battery according to an embodiment of the present invention.

As illustrated in FIG. 3A, in the cylindrical secondary battery according to an embodiment, when the internal gas pressure of the case is greater than a predetermined first pressure (operating pressure) and smaller than a predetermined second pressure (breaking pressure), the top plate 141 may be upwardly convexly deformed or inverted by the internal gas pressure, so that the top plate 141 is electrically disconnected from the bottom plate 144. That is to say, as the first region 144a of the bottom plate 144 is broken, the first region 144a is separated from the second region 144b. In other words, as the grooves 144d of the first region 144a are broken, some regions of the first region 144a may be separated upward in a state in which the first region 144a is connected to the top plate 141, thereby eventually blocking the current path established between the top plate 141 and the bottom plate 144.

However, when the internal gas pressure of the cylindrical secondary battery is smaller than the second pressure (breaking pressure), the sealed state of the cylindrical secondary battery is still maintained by the cap plate 141, thereby preventing the internal gas from being released to the outside.

When the cylindrical secondary battery is overcharged, when an internal short-circuit occurs to the cylindrical secondary battery due to penetration and/or collapse, or when an external short-circuit occurs to the cylindrical secondary battery, internal gas may be generated due to decomposition of an electrolyte or decomposition of an active material layer, resulting in an increase in the internal gas pressure of the cylindrical secondary battery.

Such an increase in the internal gas pressure of the cylindrical secondary battery may suggest that the cylindrical secondary battery is at an abnormal state, and thus the current path is blocked by the above-mentioned mechanical mechanism, thereby improving safety of the secondary battery.

As illustrated in FIG. 3B, in the cylindrical secondary battery according to an embodiment of the present invention, when the internal gas pressure of the case is greater than a predetermined second pressure (breaking pressure), the top plate 141 is broken to thus rapidly release the internal gas without any obstructions. That is to say, as the notch 141c formed on the bottom surface 141b of the top plate 141 is broken, the gas existing within the cylindrical secondary battery is rapidly released to the outside, thereby preventing explosion of the cylindrical secondary battery and ultimately increasing the safety of the cylindrical secondary battery. From the viewpoint of safety, releasing the internal gas to the outside in advance is better than letting the cylindrical secondary battery explode under a high pressure in such a way as described above.

In addition, the breaking pressure (or second pressure) of the top plate 141 may be adjusted by the location and depth of the notch 141c. For example, the breaking pressure may be increased by arranging the notch 141c to be outward positioned relative to the upper region 141d and reducing the depth of the notch 141c, and the breaking pressure may be reduced by arranging the notch 141c to be inward positioned relative to the upper region 141d and increasing the depth of the notch 141c, but embodiments of the present invention are not limited thereto.

Hereinafter, a configuration of a cylindrical secondary battery according to another embodiment of the present invention will be described.

Figure 4:
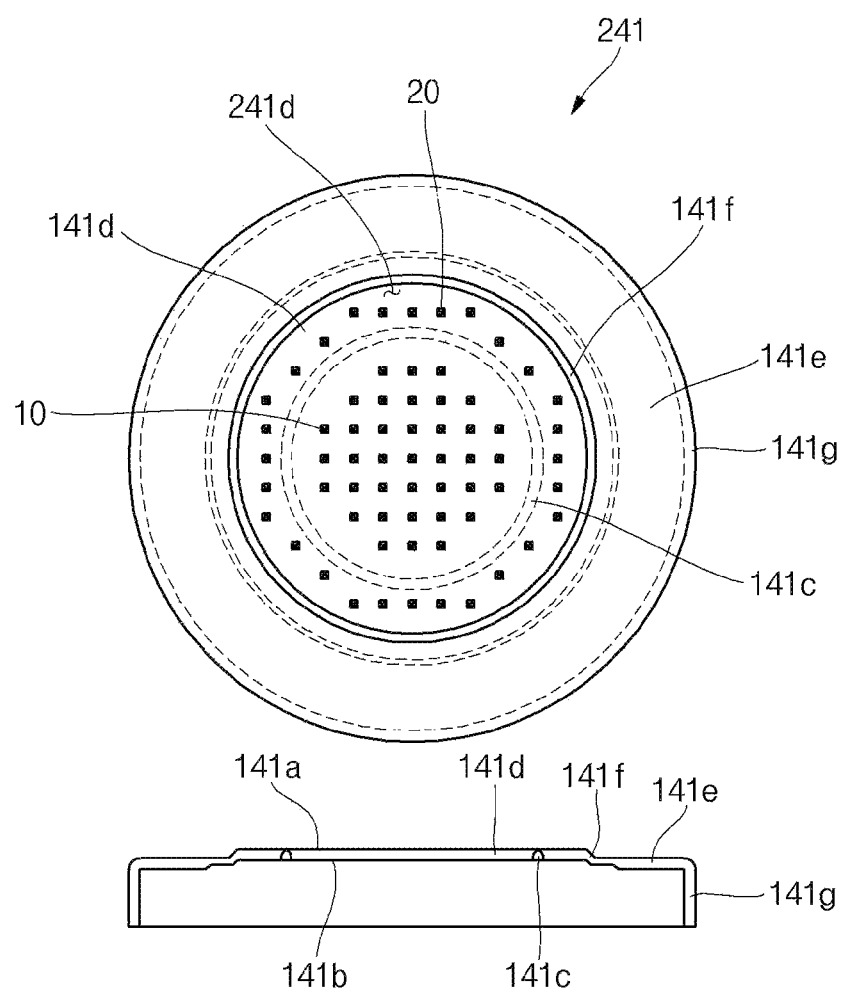
FIG. 4 illustrates top and side surfaces of a cap plate together in a cylindrical secondary battery according to another embodiment of the present invention.

FIG. 4 illustrates top and side surfaces of a cap plate together in a cylindrical secondary battery according to another embodiment of the present invention.

Referring to FIG. 4, the cylindrical secondary battery according to another embodiment may be different from the cylindrical secondary battery according to the previous embodiment in view of a configuration of the cap plate 241.

The cap plate 241 may include not only a surface-treated region 10 that is horizontally inward positioned relative to the notch 141c with respect to an upper region 241d but also a surface-treated region 20 that is outward positioned relative to the notch 141c. That is to say, the surface-treated regions 10 and 20 may be formed on portions of the upper region 241d, except for the region where the notch 141c is located.

This makes the battery safety achieved by maintaining the predetermined first pressure (operating pressure) resulting from the formation of the notch 141c while maximizing the scratch resistance and the pressure resistance when the surface-treated region is brought into contact with an external device. Of course, distances between the concave-convex structures formed on the surface-treated regions 10 and 20 and depths (or heights) thereof may be selected according to the option made by a person skilled in the art.

Hereinafter, a configuration of a cylindrical secondary battery according to still another embodiment of the present invention will be described.

Figure 5:
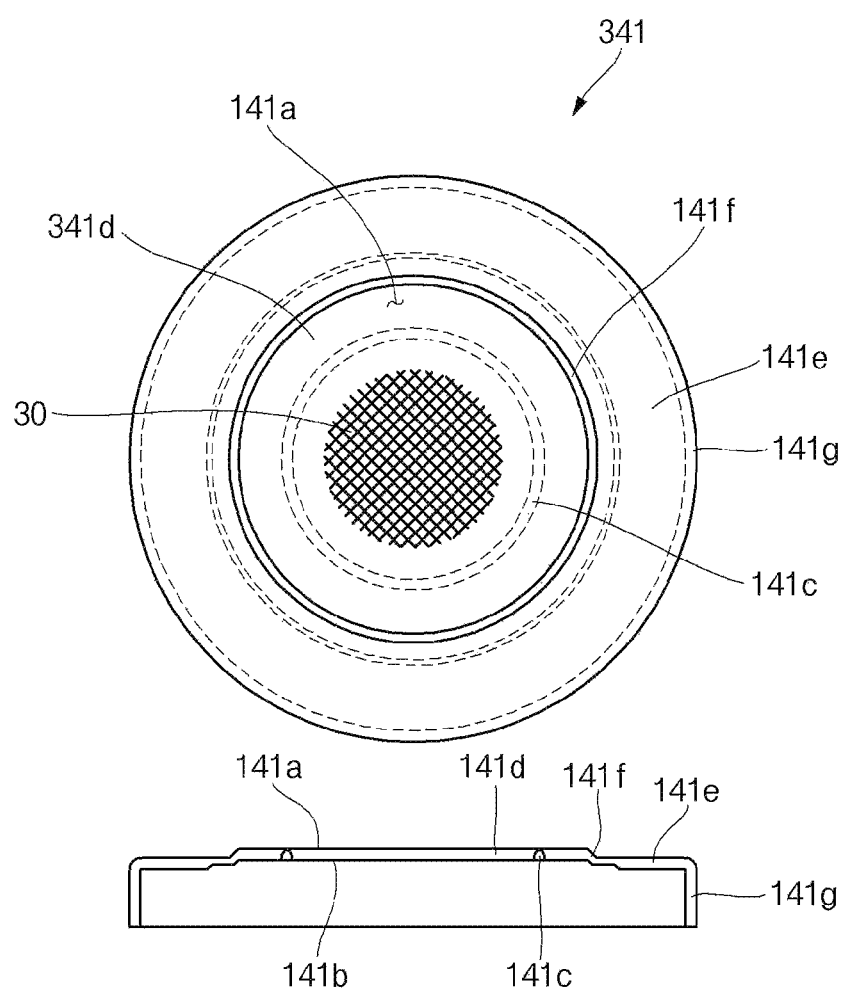
FIG. 5 illustrates top and side surfaces of a cap plate together in a cylindrical secondary battery according to still another embodiment of the present invention.

FIG. 5 illustrates top and side surfaces of a cap plate together in a cylindrical secondary battery according to still another embodiment of the present invention.

Referring to FIG. 5, the cylindrical secondary battery according to still another embodiment may be different from the cylindrical secondary battery according to the previous embodiment in view of a configuration of the cap plate 341.

The cap plate 341 may be configured such that a surface-treated region 30 is formed by forming a plurality of grooves on a top surface of an upper region 341d in advance. Although the latticed grooves are illustrated in FIG. 5, the grooves may be formed in a plurality of parallel line shapes, instead of the latticed shape, according to the option made by a person skilled in the art. In addition, although the illustrated embodiment shows that the grooves of the surface-treated region 30 are formed only positioned inwardly relative to the notch 141c in a horizontal direction on the upper region 341d, the grooves may be additionally formed so as to be positioned outward relative to the notch 141c. The groove shapes may facilitate simplification of a surface treatment process and reduction of a surface treatment process time in forming the surface-treated region 30, compared to knurling or embossing treatment. Optionally, the groove shapes of the present embodiment may be combined with the above knurled or embossed shape.

Although the foregoing embodiments have been described to practice the cylindrical secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A cylindrical secondary battery comprising:
a cylindrical case;
an electrode assembly received in the case; and
a cap assembly for sealing the case,
wherein the cap assembly comprises a top plate having a notch formed on at least one surface thereof, a middle plate coupled to the top plate and including a first through-hole formed through the center thereof, and a bottom plate electrically connected with the electrode assembly and coupled to the top plate through the first through-hole of the middle plate, and includes a surface-treated region formed by surface-treating a surface of the top plate so as to have a concave-convex structure, wherein the top plate comprises a centrally positioned upper region and an edge region coupled to the upper region through a stepped region, the edge region being positioned downward of the centrally positioned upper region.

2. The cylindrical secondary battery of claim 1, wherein the surface-treated region is formed on the surface of the top plate so as to deviate from a region where the notch is located.

3. The cylindrical secondary battery of claim 1, wherein the surface-treated region is formed on the surface of the top plate so as to be inward positioned relative to a region where the notch is located.

4. The cylindrical secondary battery of claim 3, wherein the surface-treated region is additionally formed on the surface of the top plate so as to be outward positioned relative to the region where the notch is located.

5. The cylindrical secondary battery of claim 1, wherein the surface-treated region is formed to have at least one shape selected from a knurled shape, an embossed shape and grooves arranged in a latticed shape or a parallel line shape.

6. The cylindrical secondary battery of claim 1, wherein the surface-treated region is formed with respect to the upper region.

7. The cylindrical secondary battery of claim 6, wherein the edge region is crimped using a crimping part formed on the case to then be coupled to the case.

8. A cylindrical secondary battery comprising:
a cylindrical case;
an electrode assembly received in the case; and
a cap assembly for sealing the case,
wherein the cap assembly comprises a top plate having a notch formed on at least one surface thereof, a middle plate coupled to the top plate and including a first through-hole formed through the center thereof, and a bottom plate electrically connected with the electrode assembly and coupled to the top plate through the first through-hole of the middle plate, and includes a surface-treated region formed by surface-treating a surface of the top plate so as to have a concave-convex structure,
the cylindrical secondary battery further comprising an insulating plate between the bottom plate and the middle plate, the insulating plate including a hole corresponding to the first through-hole of the middle plate.

9. The cylindrical secondary battery of claim 1, wherein the middle plate further includes one or more second through-holes arranged outside the first through-hole.

10. The cylindrical secondary battery of claim 1, wherein the bottom plate further includes one or more grooves located at a region coupled to the top plate through the first through-hole of the middle plate.

11. The cylindrical secondary battery of claim 10, wherein the one or more grooves are positioned horizontally inward relative to the notch of the top plate.

* * * * *